(12) United States Patent
Chen et al.

(10) Patent No.: US 8,516,512 B2
(45) Date of Patent: Aug. 20, 2013

(54) INTEGRATED GUIDE RAIL MEMBER FOR THE TILT ADJUSTING DEVICE FOR OPTICAL PICKUP HEAD

(75) Inventors: Chun-Hung Chen, Hsinchu (TW); Chuan Lee, Hsinchu (TW); Wu-Chen Lin, Hsinchu (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 0 days.

(21) Appl. No.: 13/337,358

(22) Filed: Dec. 27, 2011

(65) Prior Publication Data
US 2013/0031572 A1   Jan. 31, 2013

(30) Foreign Application Priority Data

Jul. 26, 2011   (CN) .......................... 2011 1 0210370

(51) Int. Cl.
*G11B 7/00*   (2006.01)
(52) U.S. Cl.
USPC .......................................... 720/675; 720/677
(58) Field of Classification Search
USPC ................................................. 720/672–680
See application file for complete search history.

(56) References Cited

U.S. PATENT DOCUMENTS

2006/0200838 A1* 9/2006 Yamanaka et al. ............ 720/676

FOREIGN PATENT DOCUMENTS

JP   2003203437 A   *   7/2003

OTHER PUBLICATIONS

English translation of JP 2003203437 A.*

* cited by examiner

*Primary Examiner* — Nathan Danielsen
(74) *Attorney, Agent, or Firm* — WPAT, PC; Justin King

(57) ABSTRACT

A tilt adjusting device for an optical pickup head (OPU) is fixed on a chassis of an optical drive. The device includes a first screw and a secondary guide rail. The secondary guide rail includes a guide rail part, a base part, an extension part, and an elastic element. The guide rail part is embedded into a rail notch of the OPU and the extension part has a first end and a second end connected with the base part and the guide rail part. A first compressible space is defined between the base part, the elastic element and the chassis. The first screw is penetrated through the base part and the first compressible space and screwed in the chassis. By changing a screwed depth of the first screw in a screw hole, an altitude of the guide rail part is correspondingly adjusted.

9 Claims, 4 Drawing Sheets

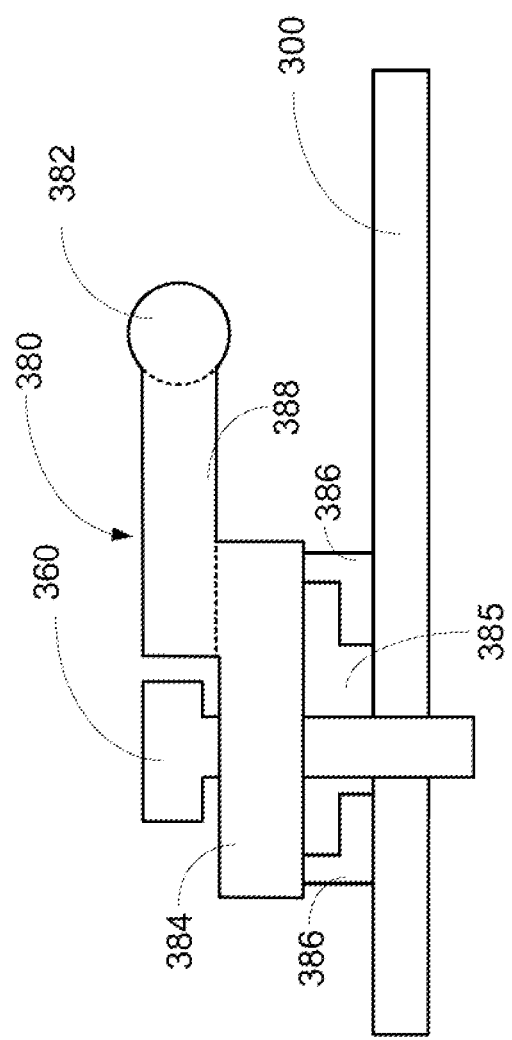

INTEGRATED GUIDE RAIL MEMBER FOR THE TILT ADJUSTING DEVICE FOR OPTICAL PICKUP HEAD

This application claims the benefit of People's Republic of China application Serial No. 201110210370.4, filed Jul. 26, 2011, the subject matter of which is incorporated herein by reference.

FIELD OF THE INVENTION

The present invention relates to an adjusting device in an optical disc drive, and more particularly to a tilt adjusting device for an optical pickup head of an optical disc drive.

BACKGROUND OF THE INVENTION

As known, an optical disc drive has an optical pickup head for projecting a laser beam onto a rotating optical disc. According to the reflected laser beam, the optical disc drive generates various electronic signals (e.g. a radio frequency signal RF, a tracking error signal TE and a focusing error signal FE). According to these electronic signals, the data stored in the optical disc are acquired and the optical pickup head can be correspondingly controlled. In addition, during the process of reading data from the optical disc or writing data into the optical disc by the optical pickup head, the data reading/writing quality is highly dependent on a tilt of the optical pickup head.

Generally, after the optical pickup head is fabricated, the optimal tilt is slightly deviated or shifted. Consequently, after the optical pickup head is assembled in the manufacturer of the optical disc drive, the tilt of the optical pickup head should be adjusted to result in an optimal angle between the optical disc and the optical pickup head. Due to the optimal angle, the laser beam emitted by the optical pickup head can be vertically projected onto the optical disc, and thus the data reading/writing quality is enhanced.

FIG. 1 is a schematic perspective view illustrating an optical pickup head of an optical disc drive according to the prior art. As shown in FIG. 1, the optical pickup head 100 has a lens 110 for projecting a laser beam and receiving the reflected laser beam. The optical pickup head 100 further comprises two rail holes 102, 104 and a rail notch 106. Through the rail holes 102, 104 and the rail notch 106, the optical pickup head 100 is supported by two guide rails 210, 220 (see FIG. 2) and movable on these two guide rails 210, 220.

Please refer to FIG. 1 again. Generally, the tilt of the optical pickup head 100 is adjusted by controlling the tilt angle of the XY-plane, i.e. by adjusting a radial tilt angle (RAD) relative to the X axis and the tangential tilt angle (TAN) relative to the Y axis.

FIG. 2 is a schematic perspective view illustrating the internal portion of a conventional optical disc drive. As shown in FIG. 2, a plurality of fixing structures 212, 214, 216, 218, 222, 224, 226 and 228 are disposed on a chassis 200 of the optical disc drive for installing the two guide rails 210 and 220. Moreover, resilience sheets 217, 227 and spring wires 215, 225 are employed for fixing the two guide rails 210 and 220.

As shown in FIG. 2, the primary guide rail 210 is penetrated through the two rail holes 102, 104 of the optical pickup head 100, and the secondary guide rail 220 is embedded into the rail notch 106. In such way, the optical pickup head 100 is movable on these two guide rails 210 and 220. Moreover, a spindle motor 230 is disposed on the chassis 200 of the optical disc drive. The optical disc (not shown) is placed on a turntable 232 of the spindle motor 230.

For adjusting the tilt of the optical pickup head 100, three screws 250, 260 and 270 are disposed on the chassis 200 of the optical disc drive for changing the altitudes of the guide rails 210 and 220 relative to the chassis 200. The screw 250 is used for changing the radial tilt angle (RAD) relative to the X axis. The screw 260 is used for changing the tangential tilt angle (TAN) relative to the Y axis. The screw 270 is used for changing the altitude of the optical pickup head 100.

From the above discussions, the conventional tilt adjusting device of the optical pickup head 100 uses three crews 250, 260 and 270 for adjusting the altitudes of the primary guide rail 210 and the both ends of the secondary guide rail 220. In such way, the angle between the optical pickup head 100 and the optical disc is adjusted.

The conventional tilt adjusting device, however, still has some drawbacks. For example, for adjusting the tilt of the optical pickup head, several resilience sheets, spring wires and screws are required to fix and adjust the guide rails. Since the conventional tilt adjusting device has too many parts and is assembled with high complexity, the cost of the parts and the assembling cost are increased.

SUMMARY OF THE INVENTION

Therefore, the present invention provides a tilt adjusting device for an optical pickup head. The functions of the resilience sheet, the spring wire and the secondary guide rail used in the conventional tilt adjusting device are integrated into a plastic and integral formed secondary guide rail member of the tilt adjusting device of the present invention. The secondary guide rail member further comprises an elastic element. By changing the screwed depth of a screw in a screw hole, the elastic element is differentially compressed, so that the tilt of the optical pickup head is correspondingly adjusted.

An embodiment of the present invention provides an optical disc drive. The optical disc drive includes a chassis, an optical pickup head, a primary guide rail, a first screw, and a secondary guide rail member. The optical pickup head has at least one rail hole and a rail notch. The primary guide rail is fixed on the chassis and penetrated through the rail hole. The secondary guide rail member is fixed on the chassis, and includes a guide rail part, a base part, an extension part, and an elastic element. The guide rail part is embedded into the rail notch, so that the optical pickup head is movable on the primary guide rail and the guide rail part. The extension part has a first end connected with the base part and a second end connected with the guide rail part. The elastic element is disposed under the base part and contacted with the chassis. A first compressible space is defined between the base part, the elastic element and the chassis. The first screw is penetrated through the base part and the first compressible space and screwed in the chassis. By changing a screwed depth of the first screw in a screw hole, an altitude of the guide rail part is correspondingly adjusted.

Another embodiment of the present invention provides a tilt adjusting device for an optical pickup head. The tilt adjusting device is fixed on a chassis of the optical disc drive. A primary guide rail is supported on the chassis and penetrated through at least one rail hole of the optical pickup head. The tilt adjusting device includes a first screw and a secondary guide rail member. The secondary guide rail member is fixed on the chassis, and includes a guide rail part, a base part, an extension part, and an elastic element. The guide rail part is embedded into a rail notch of the optical pickup head, so that the optical pickup head is movable on the primary guide rail and the guide rail part. The extension part has a first end connected with the base part and a second end connected with the guide rail part. The elastic element is disposed under the base part and contacted with the chassis. A first compressible space is defined between the base part, the elastic element and the chassis. The first screw is penetrated through the base part and the first compressible space and screwed in the chassis. By changing a screwed depth of the first screw in a screw hole, an altitude of the guide rail part is correspondingly adjusted.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 4 is a schematic cross-sectional view illustrating a tilt adjusting device for the optical pickup head according to the embodiment of the present invention.

DETAILED DESCRIPTION OF PREFERRED EMBODIMENTS

The present invention provides a tilt adjusting device for the optical pickup head. The functions of the resilience sheet, the spring wire and the secondary guide rail used in the conventional tilt adjusting device are integrated into a plastic and integral secondary guide rail member of the tilt adjusting device of the present invention. The secondary guide rail member further comprises an elastic element. By changing the screwed depth of a screw in a screw hole, the elastic element is differentially compressed, so that the tilt of the optical pickup head is correspondingly adjusted.

Figure 1:
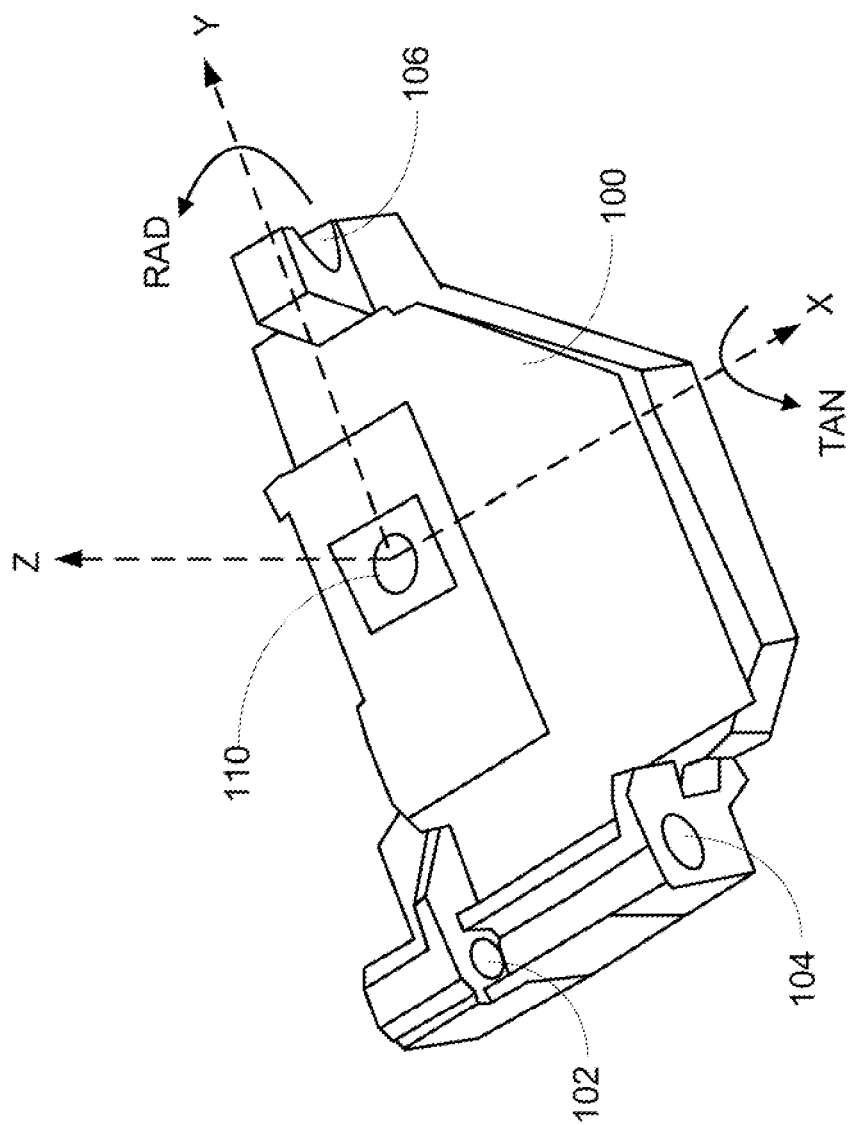
FIG. 1 (prior art) is a schematic perspective view illustrating an optical pickup head of an optical disc drive according to the prior art.
Figure 2:
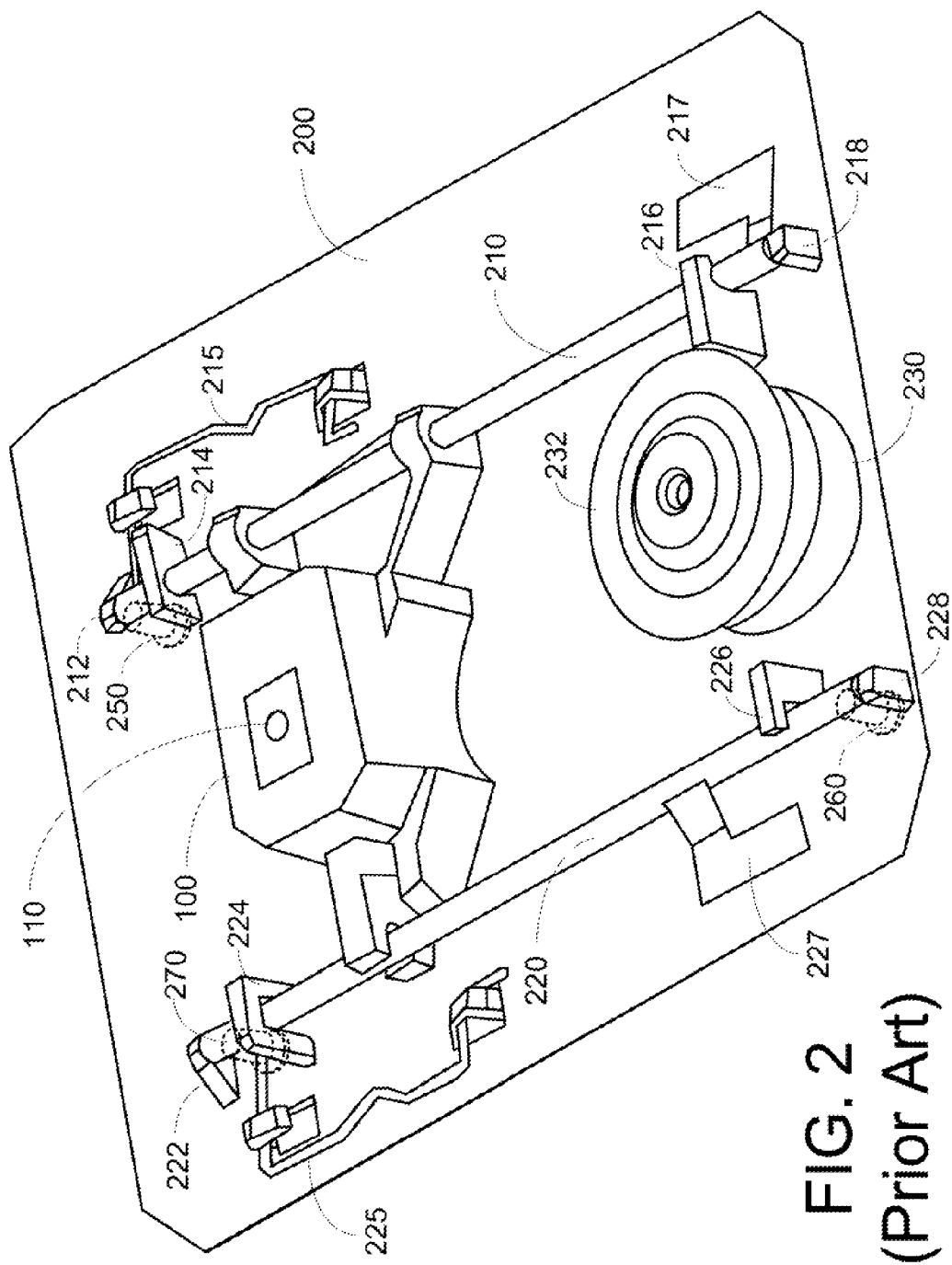
FIG. 2 (prior art) is a schematic perspective view illustrating the internal portion of a conventional optical disc drive.
Figure 3:
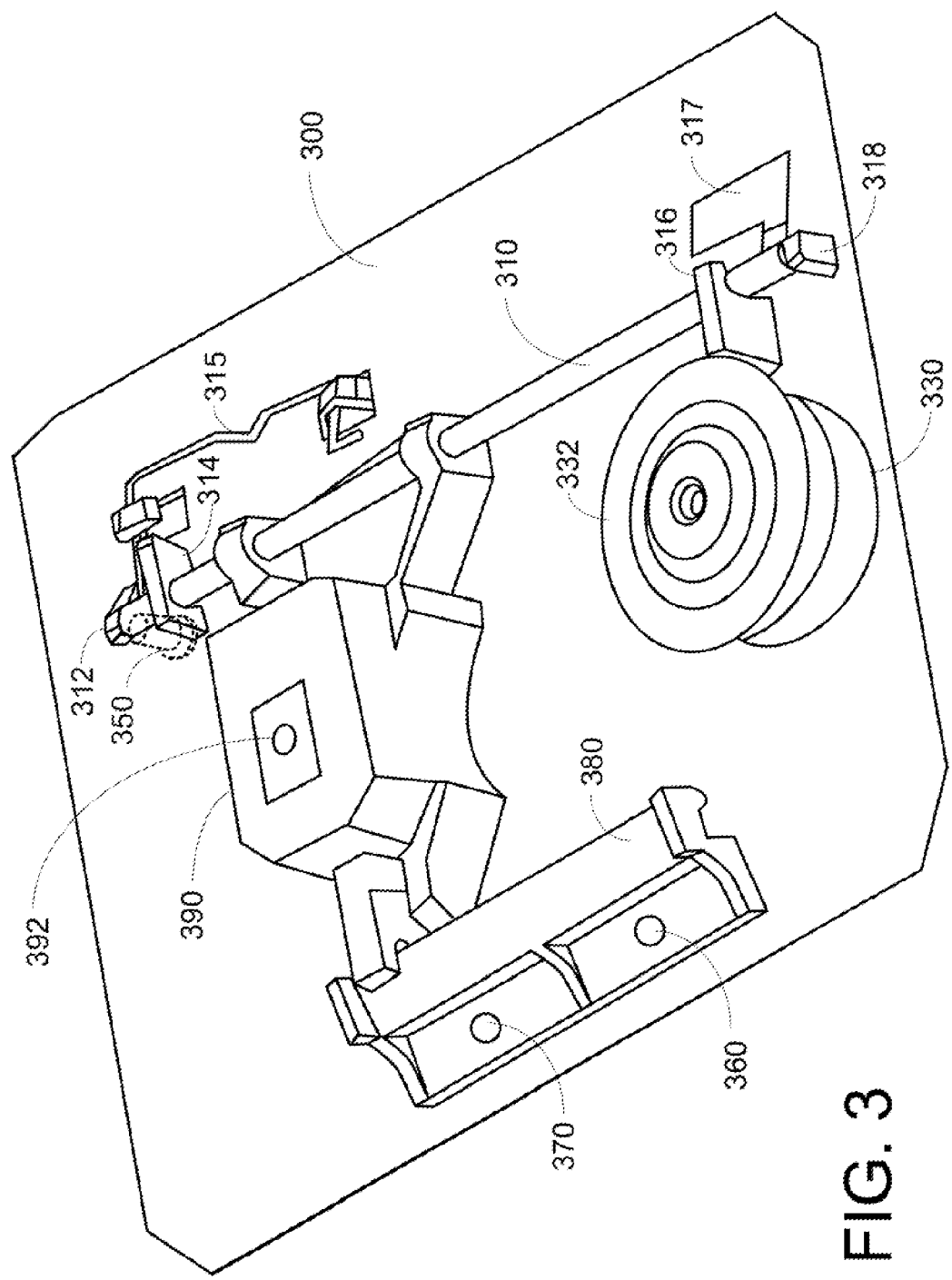
FIG. 3 is a schematic perspective view illustrating the internal portion of an optical disc drive according to an embodiment of the present invention.

FIG. 3 is a schematic perspective view illustrating the internal portion of an optical disc drive according to an embodiment of the present invention. As shown in FIG. 3, a plurality of fixing structures 312, 314, 316 and 318 are disposed on a chassis 300 of the optical disc drive for installing a primary guide rail 310. Moreover, a resilience sheet 317 and a spring wire 315 are used for fixing the primary guide rail 310. As shown in FIG. 3, the primary guide rail 310 is penetrated through two rail holes of an optical pickup head 390.

Moreover, a spindle motor 330 is disposed on the chassis 300 of the optical disc drive. The optical disc (not shown) is placed on a turntable 332 of the spindle motor 330. The lens 392 of the optical pickup head 390 is used for projecting a laser beam on the rotating optical disc and receiving the reflected laser beam.

In this embodiment, a plastic and integral secondary guide rail member 380 is partially embedded into a rail notch of the optical pickup head 390. Consequently, the optical pickup head 390 is movable on the primary guide rail 310 and the secondary guide rail member 380. The secondary guide rail member 380 further comprises an elastic element. By changing the screwed depth of the screw 360 or 370 in the screw holes, the elastic element is differentially compressed, so that the tilt of the optical pickup head is correspondingly adjusted.

FIG. 4 is a schematic cross-sectional view illustrating a tilt adjusting device for an optical pickup head according to the embodiment of the present invention. The tilt adjusting device comprises a secondary guide rail member 380 and a screw 360. The secondary guide rail member 380 comprises a base part 384, an extension part 388, a guide rail part 382, and an elastic element 386. The elements of the secondary guide rail member 380 are integrally formed. A first end of the extension part 388 is connected with the base part 384. A second end of the extension part 388 is connected with the guide rail part 382. The guide rail part 382 is embedded into the rail notch of the optical pickup head 390. The elastic element 386 is disposed under the base part 384 and contacted with the chassis 300 of the optical disc drive. Moreover, a compressible space 385 is defined between the base part 384, the elastic element 386 and the chassis 300 of the optical disc drive. The screw 360 is penetrated through the base part 384 and the compressible space 385, and screwed in the screw hole of the chassis 300. By changing the screwed depth of the screw 360 in the screw hole, the height of the elastic element 386 and base part 384 is correspondingly adjusted. Since the altitude of the guide rail part 382 (connected to the base part 384) is changed, the purpose of adjusting the tilt of the optical pickup head 390 is achieved.

Moreover, as shown in FIG. 3, the secondary guide rail member 380 provides two compressible spaces. These two compressible spaces are controlling by respectively adjusting the screws 360 and 370. The number of the screws may be varied according to the practical requirements. For example, a single screw is still feasible.

From the above discussions, the secondary guide rail member 380 used in the tilt adjusting device of the present invention is integrally formed by a plastic molding process, so that the number of individual parts is reduced. Moreover, by using the screws 360 and 370 to change the altitude of the guide rail part 382 of the secondary guide rail member 380, the tilt of the optical pickup head 390 is correspondingly adjusted.

Of course, an additional screw 350 may be disposed on the chassis 300 of the optical disc drive and located at an end of the primary guide rail 310 for adjusting the altitude of the primary guide rail 310. That is, the screw 350 is used for changing the radial tilt angle relative to the X axis, the screw 360 is used for changing the tangential tilt angle relative to the Y axis, and the screw 370 is used for changing the altitude of the optical pickup head 390.

From the above description, since the secondary guide rail member 380 used in the tilt adjusting device of the present invention is integrally formed by a plastic molding process, the number of individual parts is reduced. Moreover, the elastic element 386 is integrated into the secondary guide rail member 380, and the screws are used for fixing the elastic element 386 and adjusting the tilt of the optical pickup head 390. In such way, the number of individual parts of the optical disc drive and the assembling complexity will be reduced. Under this circumstance, the cost of the parts and the assembling cost are increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical disc drive, comprising:
   a chassis;
   an optical pickup head having at least one rail hole and a rail notch;
   a primary guide rail fixed on the chassis and penetrated through the rail hole;
   a first screw; and
   a secondary guide rail member fixed on the chassis, and comprising:
   a guide rail part embedded into the rail notch, so that the optical pickup head is movable on the primary guide rail and the guide rail part;
   a base part;
   an extension part having a first end connected with the base part and a second end connected with the guide rail part; and
   an elastic element disposed under the base part and contacted with the chassis, wherein a first compressible space is defined between the base part, the elastic element and the chassis and the elastic element is an L-shape element having one end connected to the base part,
   wherein the guide rail part, the base part, the extension part and the elastic element of the secondary guide rail member are integrally formed;
   wherein the first screw is penetrated through the base part and the first compressible space and screwed in the chassis, wherein by changing a screwed depth of the first screw in a screw hole, an altitude of the guide rail part is correspondingly adjusted.

2. The optical disc drive as claimed in claim 1, wherein a second compressible space is further defined between the elastic element, the base part and the chassis, and a second screw is penetrated through the base part and the second compressible space and screwed in the chassis, wherein by changing a screwed depth of the second screw in a screw hole, the altitude of the guide rail part is correspondingly adjusted.

3. The optical disc drive as claimed in claim 2, further comprising a third screw, which is located at an end of the primary guide rail and screwed in the chassis, wherein by changing a screwed depth of the third screw in a screw hole, an altitude of the primary guide rail is correspondingly adjusted.

4. The optical disc drive as claimed in claim 3 further comprising a spindle motor, which is fixed on the chassis for supporting and rotating an optical disc, wherein by adjusting the first screw, the second screw or the third screw, a tilt angle between the optical pickup head and the optical disc is correspondingly adjusted.

5. The optical disc drive as claimed in claim 1, wherein the guide rail part, the base part, the extension part and the elastic element of the secondary guide rail member are made of plastic material.

6. A tilt adjusting device for an optical pickup head, the tilt adjusting device being fixed on a chassis of the optical disc drive, a primary guide rail being supported on the chassis and penetrated through at least one rail hole of the optical pickup head, the tilt adjusting device comprising:
   a first screw;
   a secondary guide rail member fixed on the chassis, and comprising:
   a guide rail part embedded into a rail notch of the optical pickup head, so that the optical pickup head is movable on the primary guide rail and the guide rail part;
   a base part;
   an extension part having a first end connected with the base part and a second end connected with the guide rail part; and
   an elastic element disposed under the base part and contacted with the chassis, wherein a first compressible space is defined between the base part, the elastic element and the chassis and the elastic element is an L-shape element having one end connected to the base part,
   wherein the guide rail part, the base part, the extension part and the elastic element of the secondary guide rail member are integrally formed;
   wherein the first screw is penetrated through the base part and the first compressible space and screwed in the chassis, wherein by changing a screwed depth of the first screw in a screw hole, an altitude of the guide rail part is correspondingly adjusted.

7. The tilt adjusting device as claimed in claim 6, wherein a second compressible space is further defined between the elastic element, the base part and the chassis, and a second screw is penetrated through the base part and the second compressible space and screwed in the chassis, wherein by changing a screwed depth of the second screw in a screw hole, the altitude of the guide rail part is correspondingly adjusted.

8. The tilt adjusting device as claimed in claim 7 further comprising a spindle motor, which is fixed on the chassis for supporting and rotating an optical disc, wherein by adjusting the first screw or the second screw, a tilt angle between the optical pickup head and the optical disc is correspondingly adjusted.

9. The tilt adjusting device as claimed in claim 6, wherein the guide rail part, the base part, the extension part and the elastic element of the secondary guide rail member are made of plastic material.

* * * * *